United States Patent
Buttolo et al.

(10) Patent No.: US 9,813,878 B1
(45) Date of Patent: Nov. 7, 2017

(54) METHOD AND APPARATUS FOR VEHICLE OCCUPANT LOCATION DETECTION

(71) Applicant: FORD GLOBAL TECHNOLOGIES, LLC, Dearborn, MI (US)

(72) Inventors: Pietro Buttolo, Dearborn Heights, MI (US); James Stewart Rankin, II, Novi, MI (US); Jeffrey A. Wallace, Walled Lake, MI (US); Jeroen Lem, Maastricht (NL); Carsten Starke, Zuid (NL); Volker Scheer, Roetgen (DE); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/158,697

(22) Filed: May 19, 2016

(51) Int. Cl.
| | |
|---|---|
| H04W 4/04 | (2009.01) |
| H04W 4/02 | (2009.01) |
| H04L 29/08 | (2006.01) |
| H04M 1/60 | (2006.01) |

(52) U.S. Cl.
CPC .......... *H04W 4/046* (2013.01); *H04L 67/306* (2013.01); *H04W 4/021* (2013.01); *H04M 1/6091* (2013.01)

(58) Field of Classification Search
None
See application file for complete search history.

(56) References Cited

U.S. PATENT DOCUMENTS

| | | | |
|---|---|---|---|
| 9,188,449 B2 | 11/2015 | Biswal et al. | |
| 2010/0235866 A1* | 9/2010 | Jangid | H04N 7/17336 725/76 |
| 2011/0021234 A1* | 1/2011 | Tibbitts | H04W 48/04 455/517 |
| 2012/0006610 A1* | 1/2012 | Wallace | H04M 1/67 180/272 |
| 2013/0210406 A1* | 8/2013 | Vidal | H04W 4/00 455/418 |
| 2015/0081169 A1 | 3/2015 | Pisz | |
| 2015/0127215 A1 | 5/2015 | Chatterjee | |
| 2015/0162652 A1* | 6/2015 | Yang | H01M 10/6563 429/50 |
| 2015/0256668 A1* | 9/2015 | Atkinson | H04M 1/6075 455/418 |
| 2016/0057574 A1* | 2/2016 | Park | H04L 67/12 455/456.2 |

* cited by examiner

*Primary Examiner* — Daniel Lai
(74) *Attorney, Agent, or Firm* — Jennifer Stec; Brooks Kushman P.C.

(57) ABSTRACT

A system includes a plurality of wireless transceivers deployed in a vehicle cabin and a processor configured to receive a relay signal from a transceiver, including a device identification and a received signal strength indicator (RSSI) associated with a device signal. The processor is also configured to use the RSSI and device identification, associated with a single device, included in relay signals from multiple transceivers to determine a device location and store the device location and corresponding possessor identification and location in memory.

16 Claims, 6 Drawing Sheets

METHOD AND APPARATUS FOR VEHICLE OCCUPANT LOCATION DETECTION

TECHNICAL FIELD

The illustrative embodiments generally relate to a method and apparatus for vehicle occupant location detection.

BACKGROUND

There is a growing usefulness in determining the presence, permanence and location of passengers and drivers, inside and outside a vehicle. Current occupant detection and location systems utilize cameras, seat sensors and key-fob or mobile device detection. Each of these systems has some drawbacks, however.

Camera systems can be expensive due to requisite computational power and optics requirements, so that a vision system camera can distinguish one face from another. Additionally, users being recognized must be in view of the camera and cannot have any obstruction (scarf, coat collar, hat etc) blocking a recognizable portion of their face. Further, ambient conditions such as glare from excessive sunlight or a dark environment can cause difficulty in recognizing faces.

Seat sensors can detect weight in a seat, but cannot necessarily distinguish between a load and an occupant. Further, since multiple people may have similar weights, the sensor may have difficulty assigning an identity to a detected occupant.

Fob detection works for the driver (and any other occupant carrying a fob. A problem with this is that another party (spouse, child) could be carrying the fob, and the system may have no way of discerning which party is carrying the fob. Similarly, mobile phone detection may work reasonably, but shared phones and phones left lying in vehicles can cause some confusion, either because a wrong party is identified (the wrong party being in possession of another's phone) or because a phone left in the vehicle causes an identification of a non-present party.

If a vehicle can accurately identify and locate the individual occupants, the vehicle can leverage a variety of useful related services. Content can be directed to those occupants (e.g., favorite media, children's media for children, etc.), services can be offered to those occupants, and even medical information on a per-occupant basis can be known.

SUMMARY

In a first illustrative embodiment, a system includes a plurality of wireless transceivers deployed in a vehicle cabin and a processor configured to receive a relay signal from a transceiver, including a device identification and a received signal strength indicator (RSSI) associated with a device signal. The processor is also configured to use the RSSI and device identification, associated with a single device identification, included in relay signals from multiple transceivers to determine a device location and store the device location and corresponding possessor identification and location in memory.

In a second illustrative embodiment, a computer-implemented method includes receiving a plurality of signals from vehicle-deployed transceivers, each signal including a received signal strength indicator (RSSI) and a device identification. The method also includes determining a device location within the vehicle based on the RSSI for a plurality of device-specific signals received from the transceivers, for each device identified by the device identification and storing a location of each device in the vehicle, based on the determined device location.

In a third illustrative embodiment, a system includes a plurality of wireless transceivers deployed in a vehicle cabin and a processor configured to receive a relay signal from the transceivers, including a device identification and a received signal strength indicator (RSSI) associated with a device signal. The processor is also configured to determine a device location based on the RSSI for a plurality of signal received with respect to a single device identification. The processor is further configured to store a possessor identification, corresponding to the device identification, and possessor location, corresponding to the device location, in memory and update a possessor profile with the possessor location, representing a frequent possessor location, if the possessor location corresponds to a location observed for that possessor more than a predetermined threshold number of times.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
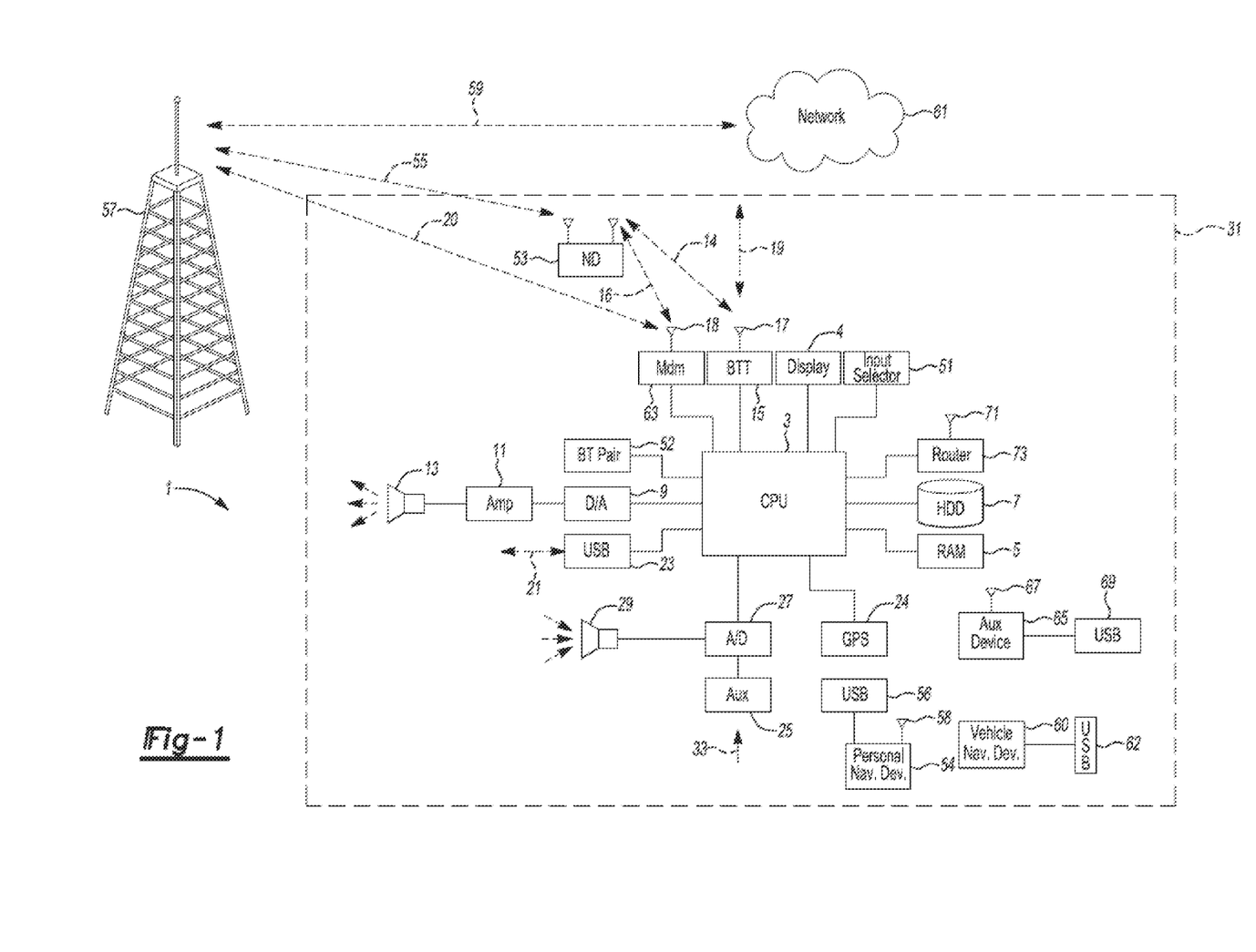
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device.

Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

The illustrative embodiments utilize wireless BLUETOOTH low energy (BLE) or other wireless signals to recognize user wearables and to triangulate user positions within a vehicle. Because a wearable (such as a watch) is typically worn by the owner, and because such a device is not commonly left lying in the vehicle, tracking a watch or other similar device and assigning a predicted possessor may result in a much higher recognition rate. And, if the device has biometric feedback included, the device itself may be able to distinguish between multiple wearers, providing even further assurance that a possessor prediction is accurate.

The illustrative embodiments use modules which include interior components that have included wireless detection and communication capability. Capable of both recognizing wireless device signals and relaying those signals to a central repository, these modules are plug-and-play in nature, so that existing vehicles can be easily retrofit for occupant location detection. Through the use of multiple modules, user location can be triangulated based on signal strength detection, and thus the location of wearables (and presumably the owners) within a vehicle can be determined by the modules in conjunction with a central system.

Figure 2:
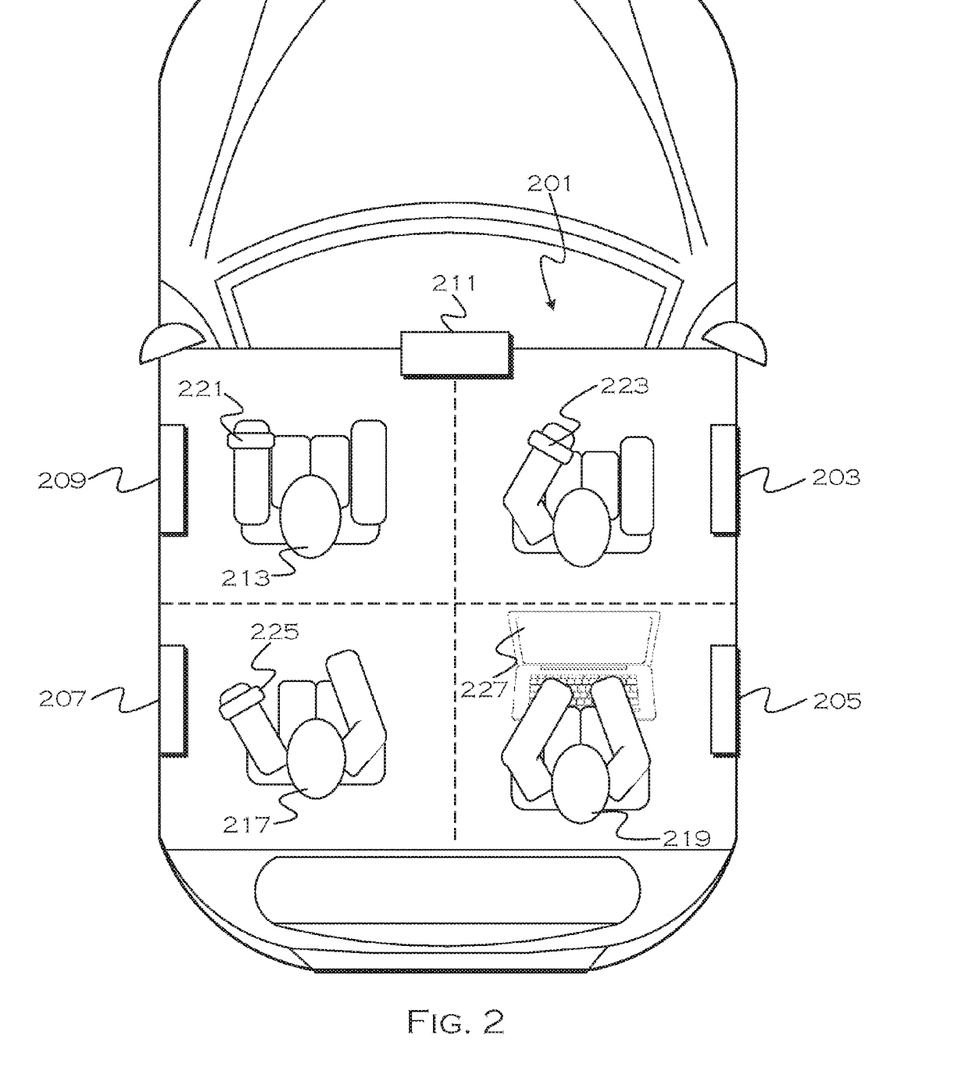
FIG. 2 shows an illustrative vehicle environment.

FIG. 2 shows an illustrative vehicle environment. In this example, four occupants 213, 215, 217, 219 are present in a vehicle 201. The vehicle cabin is equipped with modules included with the dome lights 203, 205, 207, 209, which provides a line-of-sight (useful to prevent signal attenuation) to most positions in the vehicle, as well as from each module to the central receiver 211.

In this example, the driver 213 is wearing a smart watch 221, as is the front passenger 215 (watch 225) and the driver's side rear passenger 217 (watch 225). The passenger 219 is holding a tablet 227, which can also be detectable.

Wearables typically broadcast a presence signal, so each wearable 221, 223, 225 may be periodically or continually broadcasting an announcement over BLE or other wireless medium. On the other hand, the tablet may require explicit instructions to broadcast a signal, or may require running an application thereon to be recognized. Unless the tablet automatically identifies itself to local wireless receivers, it may be easier to identify a person through a wearable than through another possessed wireless device.

Also, it is far less likely that any passenger will remove a watch and pass it to another occupant. The tablet can be easily passed from passenger to passenger, or stored in a center console, under a seat, etc. Thus, it may be difficult to determine both who is in actual possession of the tablet and where that person is within the vehicle.

Each device that identifies itself can send a signal detectable by the modules 203, 205, 207 and 209. Module 209 will likely receive a stronger signal from watch 221 than will module 203, for example. A signal of medium strength (with respect to the other mentioned signals) will be received by module 207. Module 205 will likely receive a weak or the weakest signal. This information (the received signal strength indication, known as RSSI) can be used to determine that the possessor of watch 221 is located most proximate to module 209 (the driver's seat). Similar determinations can be made for the location of the other devices in the cabin, based on the received signal strength corresponding to each device at each module (or each module that receives a signal at all).

Figure 3A:
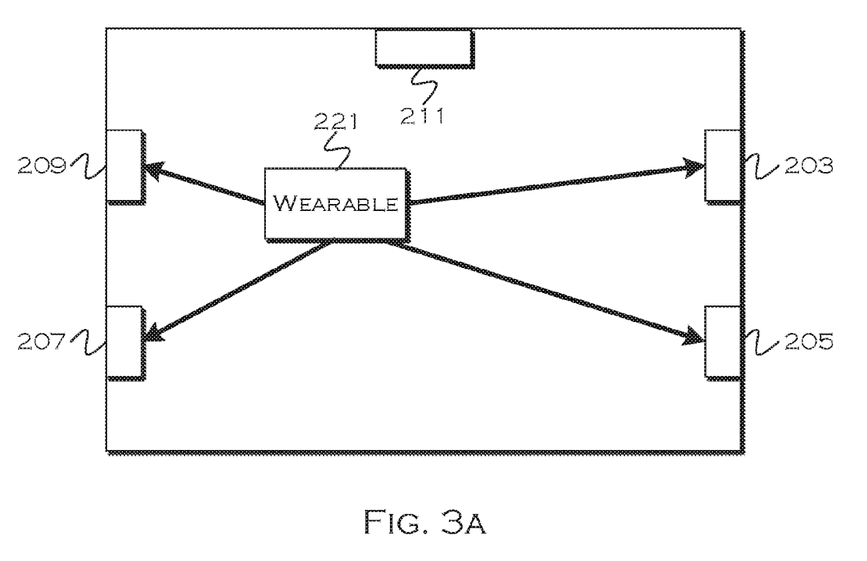
FIGS. 3A and 3B show illustrative identification transmission.
Figure 3B:
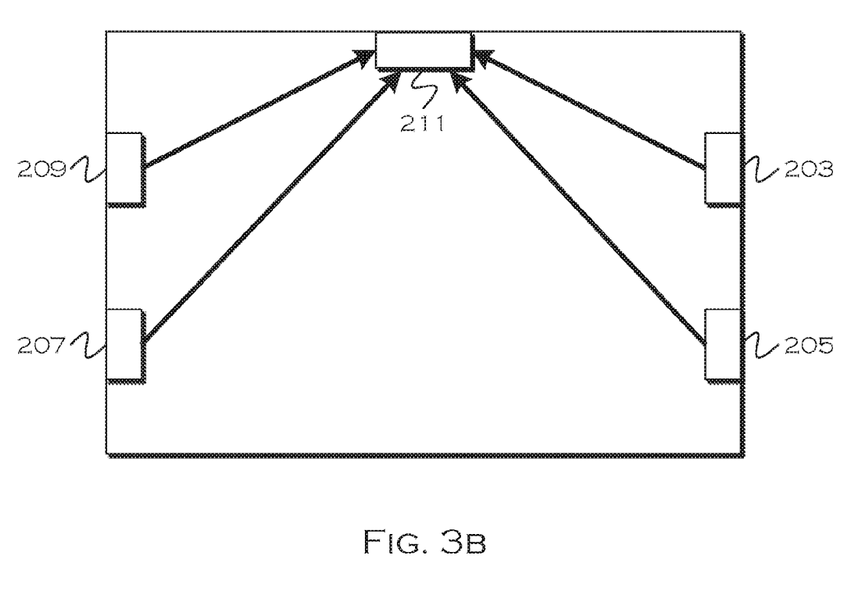

FIGS. 3A and 3B show illustrative identification transmission. In this example, the modules act as relays, receiving signals from devices located inside the cabin (or otherwise in communicable proximity to the module) and sending those signals, along with an RSSI for each signal at each device. The device may also have a unique identifier included in the signal it broadcasts, so that distinction between signals can be made on a device-by-device basis.

In FIG. 3A, the modules 203, 205, 207 and 209 each receive a signal from the device 221 worn by the driver. In FIG. 3B, each module relays the signal to a centralized processing unit 211. This unit can track occupant location, keep track of occupant profiles, track common occupants (e.g., frequent users) and can upload any or all of this information to the cloud.

When an occupant location and identification is known, any adjustments or preferences exhibited by that occupant can also be known and associated with the occupant identity. For example, a person in a rear passenger seat who watches action movies in one vehicle (i.e., the particular person actively selects the media) can have an action movie preference stored with respect to their profile, for media suggestion in another vehicle. In a similar manner, seat adjustments, HVAC adjustments and any other detectable vehicle configurations or preferences can be tracked on a per-occupant basis, associated with a profile, uploaded to the cloud and retrieved, if that user is ever in another similarly equipped vehicle. This allows for a seamless transition of preferences from vehicle to vehicle, regardless of where the particular user is located within a particular vehicle (assuming a corresponding adjustment can be made at the present location).

Figure 4:
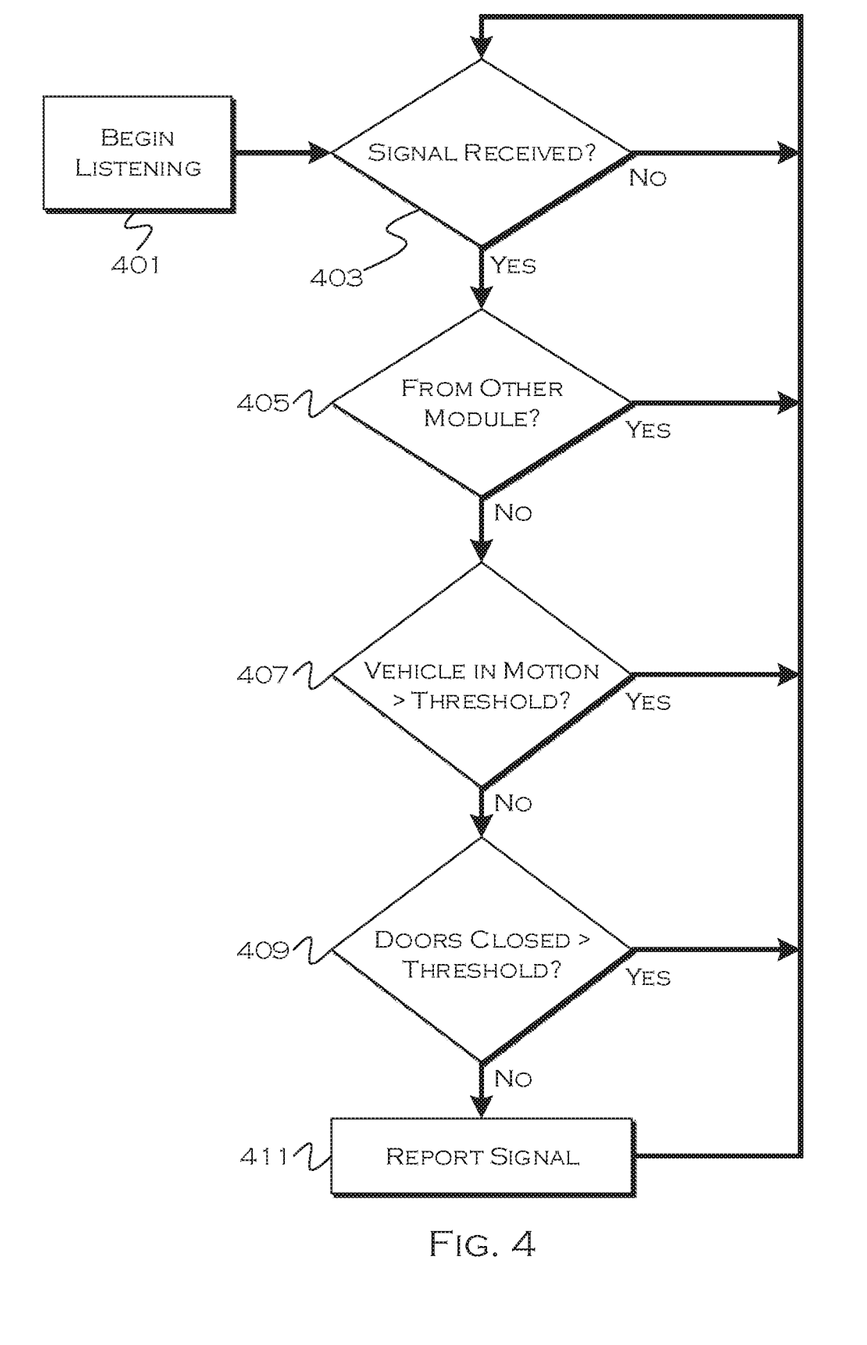
FIG. 4 shows an illustrative process for device detection and reporting.

FIG. 4 shows an illustrative process for device detection and reporting. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, after the vehicle is started (or in a background application running on low power), the process begins to listen for device signals 401. Since most wearables announce their location via BLE or other wireless signals, each module can determine if any detectable BLE or other wireless signals are present 403.

If a signal is received, a small amount of vetting, in this example, occurs at the module. First, the process determines if the signal is from another module 405. Since each module broadcasts relayed signals from the devices, if these signals were not identified as being from other modules, mistaken identification of device information and location could occur if a module thought another module's relay was a device signal. Accordingly, the relayed signal may be wrapped in a manner that clearly distinguishes it from a device signal.

Also, in this example, the process determines if the vehicle has been in motion more than a threshold amount of time 407. If the vehicle has been moving for some time, it is unlikely that the detected signal relates to a new occupant (i.e., a previously undetected occupant) since people do not typically enter moving vehicles. Similarly, the module determines if the doors have been closed more than a threshold period of time 409, as occupants do not typically enter through windows.

Although these checks 407 and 409 may help weed out redundancies, the process may also elect to forego either or both check, because some devices may simply not be powered until some point into a journey. Whether these or other vetting steps are included is largely a matter of design choice. In this example, once it has been confirmed that the signal is not from another module, the vehicle has not been in motion too long, and the doors have not been closed for too long, the signal is relayed to the central processor 411.

Figure 5A:
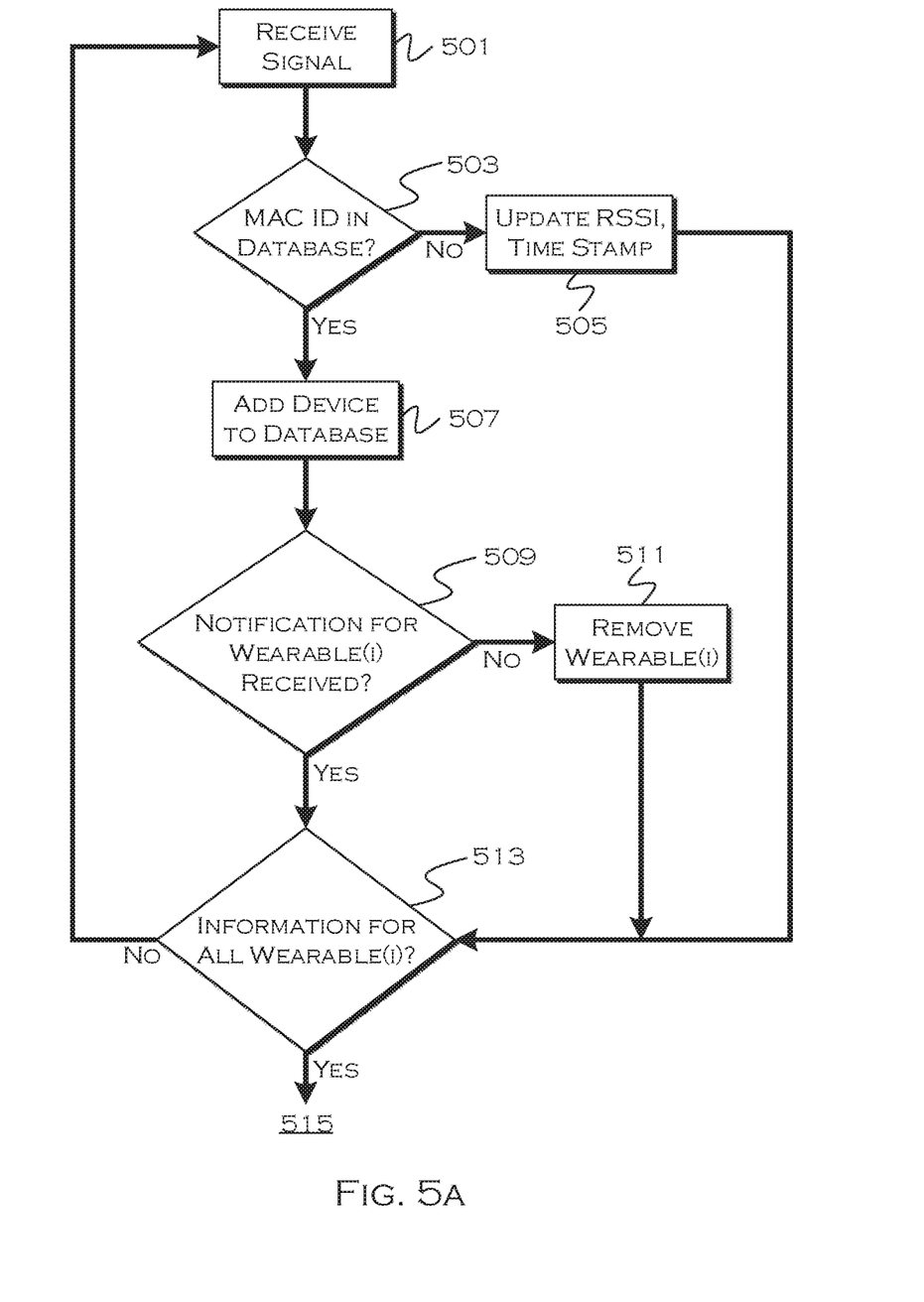
FIGS. 5A and 5B shows an illustrative process for device locating and registration.
Figure 5B:
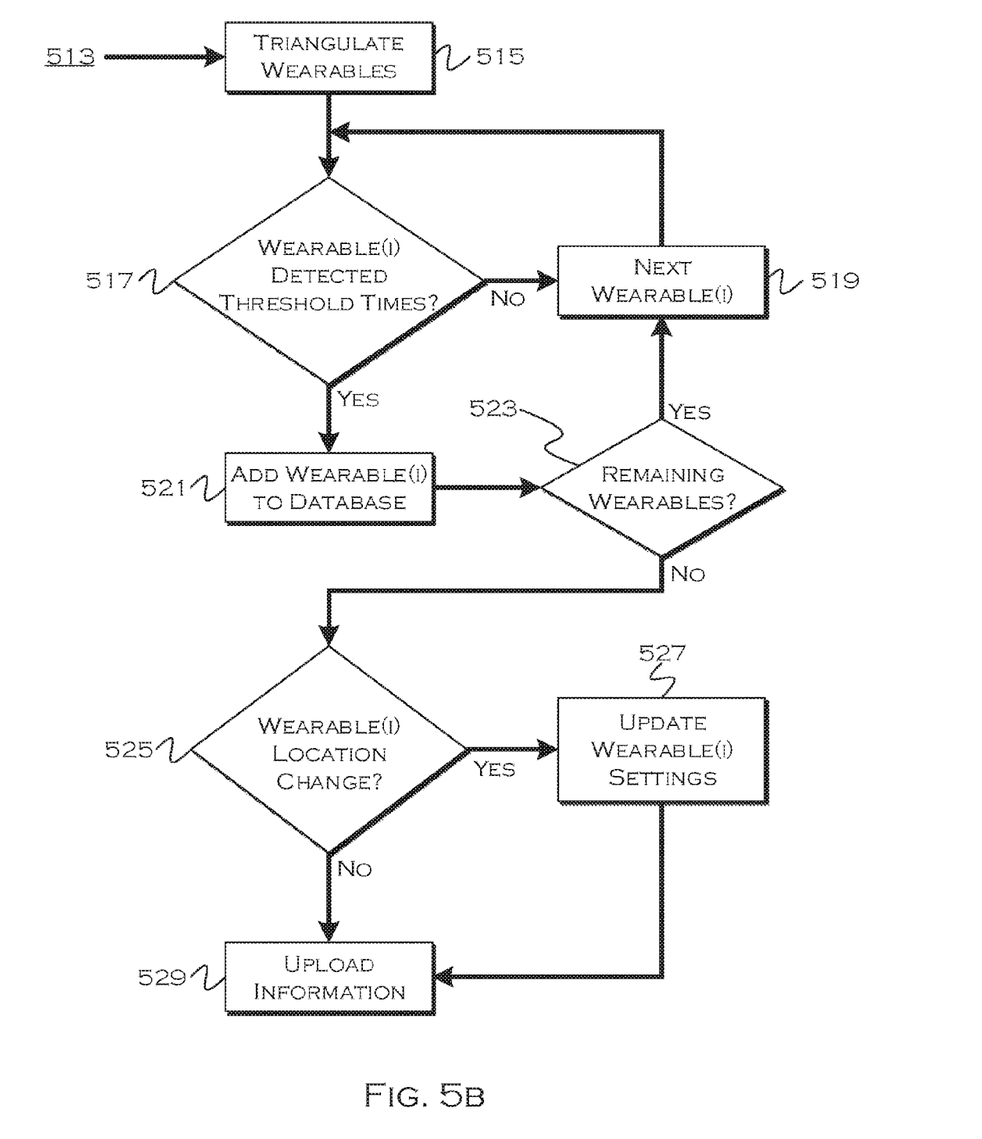

FIGS. 5A and 5B shows an illustrative process for device locating and registration. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the processor receives a signal from one of the modules 501. Each module receiving a signal from a particular device will report that signal to the central processor, so that RSSI in conjunction with device ID (such as MAC address) can be used to triangulate device location.

In this example, each received signal has a MAC address included therewith, which identifies the device which originally identified itself to the relaying module. Other suitable unique identifiers may also be used.

Here, if the MAC address is in a database 503 (i.e., the signal has been seen at least once before), the process will update a record 505 associated with the MAC address (and device) within the database. This can include, for example, updating a timestamp associated with the received signal, as well as an updated RSSI (in case the device has moved). Information about which module relayed the signal will also be included, so the record in the database for each MAC address includes which devices recognized the wearable's signal and when.

If the MAC address is not stored, a new device record will be created in the database 507. This can be a temporary or permanent entry, although in this example the entry is initially a temporary one. Along with adding the device to the database, the reporting module, signal strength, timestamp and any other appropriate information are stored.

The process will also determine if, for any wearable(i) already stored in the database, whether any information has been received within a threshold time period 509. For example, the process may run until the vehicle has been moving for two minutes, or from ten minutes from vehicle startup, or until the doors have been closed and the vehicle is moving, or any other reasonable threshold determination that all occupants "should" be in the vehicle by that point, and therefore signals from all present devices should be received, and the locations of the devices should be relatively fixed (with respect to seating).

If notification for a particular wearable has not yet been received, and a threshold time period has passed, the process may remove that wearable 511 from the database. In this example, the database may include permanent and temporary records. The permanent records may include users identified (by recognition or by occupant instruction) as frequent occupants. Profile information and other useful information (preferences, settings, etc) may be stored locally for these occupants. Also, a counter for any identified devices may be stored here, so that a vehicle can count how often a particular device is observed, to determine if the device should be registered in the permanent database portion.

The temporary database may hold information relating to all devices present in a vehicle for a particular journey. The record of a particular device may be removed from this system at a journey's end, or may persist until a journey where that device is not reported (and thus is removed on the basis of non-reporting). In this example, the process determines if information for all expected wearables(i) in the database has been received 513.

For example, if a database holds record of four devices, 221, 222, 223 and 225, and the passenger configuration shown in FIG. 2 is present, each device 221, 223 and 225 will report itself through the modules at some point.

Before the threshold time period or other journey-initiation indicia had occurred, step 513 will report "no" because information for device 222 has not yet been received (because that particular device is not present in FIG. 2). Once the threshold has passed, the device 222 will be removed from the temporary database, and step 513 will report "yes" since at least some information has been received for all present devices that are also registered in the temporary database.

At this point, the process triangulates the location of each of the wearables 515. While triangulation can be an ongoing process or determined whenever a new signal is received (assuming there is sufficient data to triangulate), in this example the triangulation is delayed until the journey has begun (the inception threshold or indicia). Each device (and predicted possessor) is assigned a location in the vehicle, and any related profile information may be accessed and utilized as may be appropriate for that person at that location.

Also, if the device reports a possessor identity (determinable, for example, through biometrics), this information can be used to more accurately identify the possessor. If the possessor is unexpected (i.e., not the previously observed possessor), a profile can be created and the device can be associated with multiple possessors.

If a wearable is detected more than a threshold number of times 517 (which can be based on a counter associated with detecting the presence of a particular wearable for multiple journeys), the process can add that wearable(i) to the permanent database 521. This stores a record of that possessor and/or device as a frequent occupant/device, and local profile information can be stored, updated and/or created as appropriate. The frequent occupant identification process can be completed for each wearable 519 as long as any wearables(i) for which the process has not yet been completed remain 523.

Also, each wearable(i) in the frequently occurring permanent database may have a location or locations associated therewith. If a new location or an unexpected location is determined with respect to a particular wearable(i) 525, the process can update a record of where that person is sitting and where that person commonly sits 527. Finally, in this example, the information pertaining to the wearables, their locations and any associated profiles and/or settings or setting changes can all be uploaded to the cloud 529.

Through use of the plug-and-play modules, any vehicle can be retrofitted with an occupant detection and locator system. By simply wearing a wearable, individual occupant locations can be detected and tracked, and occupant setting changes and preferences can be stored to the cloud in a retrievable manner, allowing porting of settings from vehicle to vehicle. Although possessor identity is not guaranteed to be accurate, a much more likely-accurate identification of the particular occupants and their respective locations can be made.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a plurality of wireless transceivers deployed in a vehicle cabin; and
   a processor configured to:
   determine location of a device, responsive to a determination that a vehicle has been moving for more than a first threshold amount of time or that vehicle doors have been closed for more than a second threshold amount of time, based on received signal strength indicators (RSSI) associated with device signal strength of a signal from the device received by at least two of the wireless transceivers and wirelessly relayed through a central transceiver in communication with the processor; and
   store the location and a corresponding possessor identification and location in memory.

2. The system of claim 1, wherein the possessor identification is based on a relationship between a device identification and a possessor, previously stored in the memory.

3. The system of claim 1, wherein the possessor identification is based on a wearer identification included with the wirelessly relayed signal.

4. The system of claim 1, wherein the processor is configured to associate the device location with a user profile associated with the possessor identification.

5. The system of claim 1, wherein the processor is configured to determine whether relayed signals been received for each device identification stored in a current-trip, and, for any device identification stored in the current-trip record for which relayed signals have not been received, remove the device identification from the current-trip record.

6. The system of claim 1, wherein the processor is configured to determine if a device has been present for more than a threshold number of journeys and store a device identification with respect to a frequent-occupant record if the device has been present for more than a threshold number of journeys.

7. The system of claim 1, wherein the processor is configured to wirelessly report device and possessor identification and location to a remote system.

8. A computer-implemented method comprising:
   receiving signals from vehicle-deployed transceivers, each signal including a received signal strength indicator (RSSI) and a device identification;
   for each device identified by the device identification, determining a device location within the vehicle based on the RSSI for a plurality of device-specific signals received from the transceivers; and
   storing the determined device locations, responsive to determining that the vehicle has been moving for more than a threshold amount of time.

9. The method of claim 8, further comprising:
   determining a possessor associated with each device; and
   wherein the storing includes storing a possessor location based on the determined device location.

10. The method of claim 9, wherein the determining a possessor further includes determining a possessor based on possessor indicia received as part of the plurality of signals for a given device.

11. The method of claim 9, wherein the determining a possessor further includes determining a possessor based on a predefined stored relationship associating the possessor with the device.

12. The method of claim 11, wherein the predefined relationship is stored locally on a vehicle computer.

13. The method of claim 11, wherein the predefined relationship is stored in a remote location.

14. The method of claim 9, further comprising uploading stored possessor locations to a remote server.

15. The method of claim 8, further comprising determining that a vehicle journey has begun before storing the device locations.

16. A system comprising:
   a plurality of wireless transceivers disposed within a vehicle cabin; and
   a processor configured to:
   receive a relay signal from the transceivers, including a device identification and a received signal strength indicator (RSSI) associated with a device signal;
   determine a device location based on the RSSI for a plurality of signals received with respect to a single device identification;
   store a possessor identification, corresponding to the device identification, and possessor location, corresponding to the device location, in memory, responsive to determining that the vehicle has been moving for a first threshold amount of time or that vehicle doors have been closed for more than a second threshold amount of time; and
   update a possessor profile with the possessor location, representing a frequent possessor location, if the possessor location corresponds to a location observed for that possessor more than a predetermined threshold number of times.

* * * * *